United States Patent Office 3,468,679
Patented Sept. 23, 1969

3,468,679
WRITING FLUID FOR BALL POINT
WRITING INSTRUMENTS
Amato Furlotti, 1476 Blue Jay Way,
Los Angeles, Calif. 90069
No Drawing. Filed Oct. 20, 1966, Ser. No. 587,993
Int. Cl. C09d 11/18
U.S. Cl. 106—22                                  7 Claims

ABSTRACT OF THE DISCLOSURE

A washable and eradicatable fluid for ball point pens is disclosed which is compounded of acid dyes, in a concentration of 10 to 20 parts per hundred; tannic acid, as a thickening agent in amounts greater than 5 parts per hundred; and a glycol vehicle in which the dyes and tannic acid are soluble. The resulting ink is water soluble and may be eradicated using conventional ink eradicators.

---

The present invention relates to a new kind of ink for ballpoint writing instruments that is water soluble and eradicatable.

The formulations of ballpoint writing fluids currently in use rely upon oil and spirit soluble dyes in suitable solvents such as the glycols and oleic acid. Spots and stains caused by such writing fluids are not eradicatable, are not easily or completely removed by solvents, and are neither soluble in nor removable by water.

According to the present invention, an ink is provided which is a saturated solution of an acid dye in a glycol such as propylene, or ethylene, or butylene or a mixture of them. To the solution is added sufficient tannic acid to produce a writing fluid of suitable viscosity and, where necessary, pH. It is the use of tannic acid that solves a heretofore existing problem which concerned the selections of acid dyes and solvents which, in the desired concentration, was of a suitable viscosity. Spots, and/or stains caused by inks according to the present invention can be removed easily from fabric or skin by washing them with water. Similarly, marks or stains can be removed from paper using conventional ink eradicators.

A saturated solution of acid dye is incapable of producing sufficiently high viscosity for ball pen writing fluids. Water soluble gums, resins and other chemical thickeners tend to produce a colloidal solution or a gel rather than a fluid, viscous solution necessary for a writing fluid. Further, most of the conventional thickeners are not compatible with the acidity that such ink requires to prevent color fading.

The acidity of the ink itself creates a problem in that a pH necessary to preserve the color and brilliancy of the ink is, sufficient to cause adverse chemical reactions with the metallic parts of the pen. Clearly, any acids used in the formulation of an ink must not cause dangerous reactions with the metallic parts of the writing instrument.

Tannic acid is able to produce in the ink, both the very high viscosity that is necessary for the ink to function properly, and, depending upon the dye, the high acidity that is necessary for the acid dye to conserve its color. For example, in one of the formulas set out below, the dye would lose its color, if its solution is not acid.

Tannic acid, which in the preferred embodiment of the present invention constitutes 70% approximately, of the weight of all the solid substances that are in solution in the ink, is responsible for the physiochemical characteristics of the ink.

Although it might not seem so, difficulties have been encountered in the production of inks according to the present invention for the following reasons: acid dyes are not very soluble, perhaps 15%–20% solubility being usual, consequently the acid dyes, alone, even in their most concentrated solutions are not able to produce the high viscosity which is required of an ink—9,000–15,000 centipoises.

Therefore, it becomes necessary to add some product that will raise the viscosity to the desired point. However, the quantity of the product, which has to be added, exceeds twice the weight of the dyes.

For a solution to the problem, a thickener must be found that is able to be dissolved permanently, in large quantities, in the quasi-saturated solution of acid dyes yet, which must be extremely soluble in the previously mentioned solvent besides being compatible with the acidity of the ink solution.

Another problem is caused by the low pH (3.6–4.0) of the ink solution because most acids which could be used to create the desired pH would react with the metal parts of the filler provoking alterations in the ink and in the working parts of the filler. Therefore, it is necessary to find an acid able to produce the specified pH without causing any undesired reactions that would eventually spoil the ink and stop the functioning of the pen.

According to the present invention, these problems are overcome by the addition of tannic acid to the ink solution, which not only creates the desired pH but which also produces the desired viscosity of the ink. Both of these goals are achieved without in any way altering the ink or the functioning of the pen. Tannic acid is so soluble in the ink solution that it can be easily dissolved at cold temperatures, in proportions as high as 35% of the weight of the total solution.

Although tannic acid has been employed in prior art fountain pen inks, only relatively small amounts were used, and for the limited purpose of forming an iron salt which gives the characteristic black color to blue-black inks. The salt formed is an iron tannate which, under the influence of light, changes color from blue to black. However, the amounts of tannic acid must be so slight that the viscosity of the fountain pen ink is not affected by its presence.

A blue ink, for example, according to the present invention would be a solution of 15% by weight of a water soluble blue acid dye, such as "soluble blue DB0325" produced by Standard Ultramarine and Color Company of Huntington, West Virginia, and which is classified as Color Index Acid-Blue 93, and 35% of tannic acid, U.S.P., in solution of 50% by weight of propylene glycol. Such an ink has a good blue color, a pH of 3.8–4.0 and a viscosity of 11000–13000 cps.

It is therefore considered within the scope of the invention to provide a writing fluid with acid dye concentrations ranging from 10 to 20 parts, tannic acid from 30 to 40 parts and a glycol solvent to make 100 parts. If the other thickeners are used as well, the tannic acid might comprise less than 30 parts per hundred parts of writing fluid. To be of any real value, the amount of tannic acid should exceed 5 parts per hundred.

Accordingly, it is an object of the present invention to provide an improved washable writing fluid for ball point pens utilizing tannic acid as a thickener.

It is a further object of invention to provide a ball point writing fluid that is washable, utilizing tannic acid, as a buffer to produce a desired acidity of solution.

It is yet another object of the present invention to provide an improved, light fast, eradicatable, washable writing fluid, utilizing water soluble acid dyes, glycol solvents and tannic acid as a thickener and acidifier.

It is a still further object of invention to provide an improved, washable, eradicatable, ball point writing fluid, made up of water soluble acid dyes, glycol solvents and tannic acid as a brightener, thickener and acidifier.

It is still a further object of invention to provide a new use for tannic acid in the process of compounding an improved water soluble ball point pen ink that may contain a concentration of acid dyes as high as 15 parts per 100, dissolved in a solvent such as propylene glycol and including tannic acid in amounts no less than 5 parts per hundred.

In a preferred embodiment of the present invention, an ink can be formulated according to the following formula:

TABLE I

| Ingredient | | |
|---|---|---|
| Dye | Soluble blue DB 0325 | 15 |
| Solvent | Propylene glycol | 50 |
| Thickener | Tannic Acid U.S.P | 35 |
| Total | | 100 |

Other inks can be made according to the following general table:

TABLE II

| Ingredient | A | B | C |
|---|---|---|---|
| Dye | 15 | 10 | 17 |
| Solvent | 50 | 50 | 50 |
| Tannic acid | 35 | 40 | 33 |

Such a solution provides a writing fluid of a viscosity of approximately 11–13,000 centipoises, and a pH of approximately 3.6–4.0. It is to be noted that despite the relatively low pH produced by the use of tannic acid, (3.6 through 4.0), the chemical activity of tannic acid does not cause damaging reactions with the metal parts of a ball point pen.

Still other acid or direct water soluble dyes of different colors can be selected and these can be utilized either alone or in combination, in proportions ranging from 5 to 15 parts of total dye, depending upon the color desired and the intensity of the dye. The range of amounts of glycol solvents, such as propylene glycol, ethylene glycol or butylene glycol to be used, can vary from 45 to 55 parts. Also, water can be added as an integral part of the solvent system, in place of some of the glycol. The amounts of tannic acid required can easily be determined. If tannic acid is the sole thickening agent, amounts ranging from not less than 30 parts to as much as 45 parts are recommended. However, other thickeners could be added and the amount of tannic acid could be decreased accordingly.

The process of making an ink according to the present invention, involves the steps of providing a suitable solvent such as propylene glycol; adding a dye soluble in propylene glycol; adding not less than 30 parts of tannic acid per hundred; and mixing and heating the combination to dissolve the dye and tannic acid, after both additives are dissolved. The solution thus produced is a suitable writing fluid.

In Table III below, there is set forth a family of formulations according to an alternative embodiment of the present invention. In the formulas of Table III, the formulas of the preferred embodiment are further modified by the addition of water to the solvent, and by the use of thickeners other than tannic acid.

TABLE III

| Acid dye | 15 | 15 | 15 | 15 |
|---|---|---|---|---|
| Glycol | 50 | 40 | 50 | 40 |
| Tannic acid | 35 | 37 | 20 | 22 |
| Other thickener | | | 15 | 15 |
| Water | | 8 | | 8 |

In many instances, it may be desirable, because of the inherent high hygroscopicity of the glycol solvents, to add amounts of water directly, so that the ambient humidity will not have a great effect on the writing fluid.

Similarly, because of the acidity of the dyes being used, it may be desirable to have lesser amounts of tannic acid. Accordingly, other thickeners can be utilized to achieve the proper viscosity for a ball point pen ink.

Thus, there has been described in several embodiments an improved washable, eradicatable writing fluid for ball point writing instruments which utilize tannic acid as both a thickener and as a source of acidity to produce an ink of proper viscosity and pH.

What is claimed as new is:

1. A washable, eradicatable writing fluid for ball point writing instruments comprising:
   (a) tannic acid U.S.P. as a thickening agent in amounts greater than five parts per hundred parts;
   (b) water soluble acid dye in the range of proportions of ten to twenty parts per hundred parts; and
   (c) a vehicle in which said tannic acid and said dye are soluble;
   whereby a writing fluid for ball point pens is produced having a viscosity in the range between 11,000 and 13,000 centipoises and a pH of from 3.6–4.0.

2. The washable, eradicatable writing fluid for ball point writing instruments of claim 1, above, wherein the fluid consists of:
   (a) 15 parts per hundred parts of an acid dye;
   (b) 35 parts per hundred parts U.S.P. tannic acid; and
   (c) 50 parts per hundred parts of propylene glycol.

3. A washable, eradicatable writing fluid for ball point writing instruments, according to claim 1, wherein said vehicle is selected from a group consisting of ethylene glycol, propylene glycol and butylene glycol, said vehicle being in the range of proportions of from 45 to 55 parts.

4. The writing fluid of claim 3, above, wherein said tannic acid U.S.P. is used in the range of proportions of from 30 to 40 parts.

5. The process of producing a washable, eradicatable writing fluid for ball point writing instruments comprising the new use of more than five parts U.S.P. tannic acid in solution with water soluble acid dyes and water soluble solvents for said dyes, said tannic acid being used for the purpose of controlling the viscosity of the writing fluid.

6. The process of claim 5 further including the new use of U.S.P. tannic acid for controlling the acidity of the writing fluid.

7. The process of claim 5, above wherein said solvents are selected from members of the group consisting of water, propylene glycol, ethylene glycol, butylene glycol, either alone or in combination.

References Cited

UNITED STATES PATENTS 2,966,680   12/1960   Anderson _____ 106—23

FOREIGN PATENTS 934,356   8/1963   Great Britain.

OTHER REFERENCES

Apps, Inks for the Minor Printing Processes and Specialized Applications, vol. 3, London Publishers—Leonard Hill, 1963.

Ellis, Printing Inks, N.Y., Reinhold Publishing Corporation, 1940.

JULIUS FROME, Primary Examiner

JOAN B. EVANS, Assistant Examiner

U.S. Cl. X.R.

106—23